United States Patent
Ma

(10) Patent No.: US 8,064,344 B2
(45) Date of Patent: *Nov. 22, 2011

(54) FLOW-BASED QUEUING OF NETWORK TRAFFIC

(75) Inventor: Qingming Ma, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/706,478

(22) Filed: Feb. 16, 2010

(65) Prior Publication Data

US 2010/0150164 A1 Jun. 17, 2010

Related U.S. Application Data

(63) Continuation of application No. 11/426,124, filed on Jun. 23, 2006, now Pat. No. 7,701,849.

(51) Int. Cl.
*H04L 12/56* (2006.01)

(52) U.S. Cl. .................. 370/230; 370/389; 370/412

(58) Field of Classification Search .................. None
See application file for complete search history.

(56) References Cited

U.S. PATENT DOCUMENTS

| 6,798,743 | B1 | 9/2004 | Ma | 370/412 |
| 7,453,804 | B1* | 11/2008 | Feroz et al. | 370/230 |
| 7,701,849 | B1* | 4/2010 | Ma | 370/230 |
| 2003/0016686 | A1* | 1/2003 | Wynne et al. | 370/412 |
| 2006/0245443 | A1* | 11/2006 | Basso et al. | 370/412 |

OTHER PUBLICATIONS

Co-pending U.S. Appl. No. 11/426,124, filed Jun. 23, 2006 entitled "Flow-Based Queuing of Network Traffic" by Qingming Ma, 28 pages.

* cited by examiner

*Primary Examiner* — Chi H. Pham
*Assistant Examiner* — Shick Hom
(74) *Attorney, Agent, or Firm* — Harrity & Harrity, LLP

(57) ABSTRACT

A method is provided for queuing packets. A packet may be received and its flow identified. It may then be determined whether a flow queue has been assigned to the identified flow. The identified flow may be dynamically assigning to an available flow queue when it is determined that a flow queue has not been assigned to the identified flow. The packet may be enqueued into the available flow queue.

19 Claims, 5 Drawing Sheets

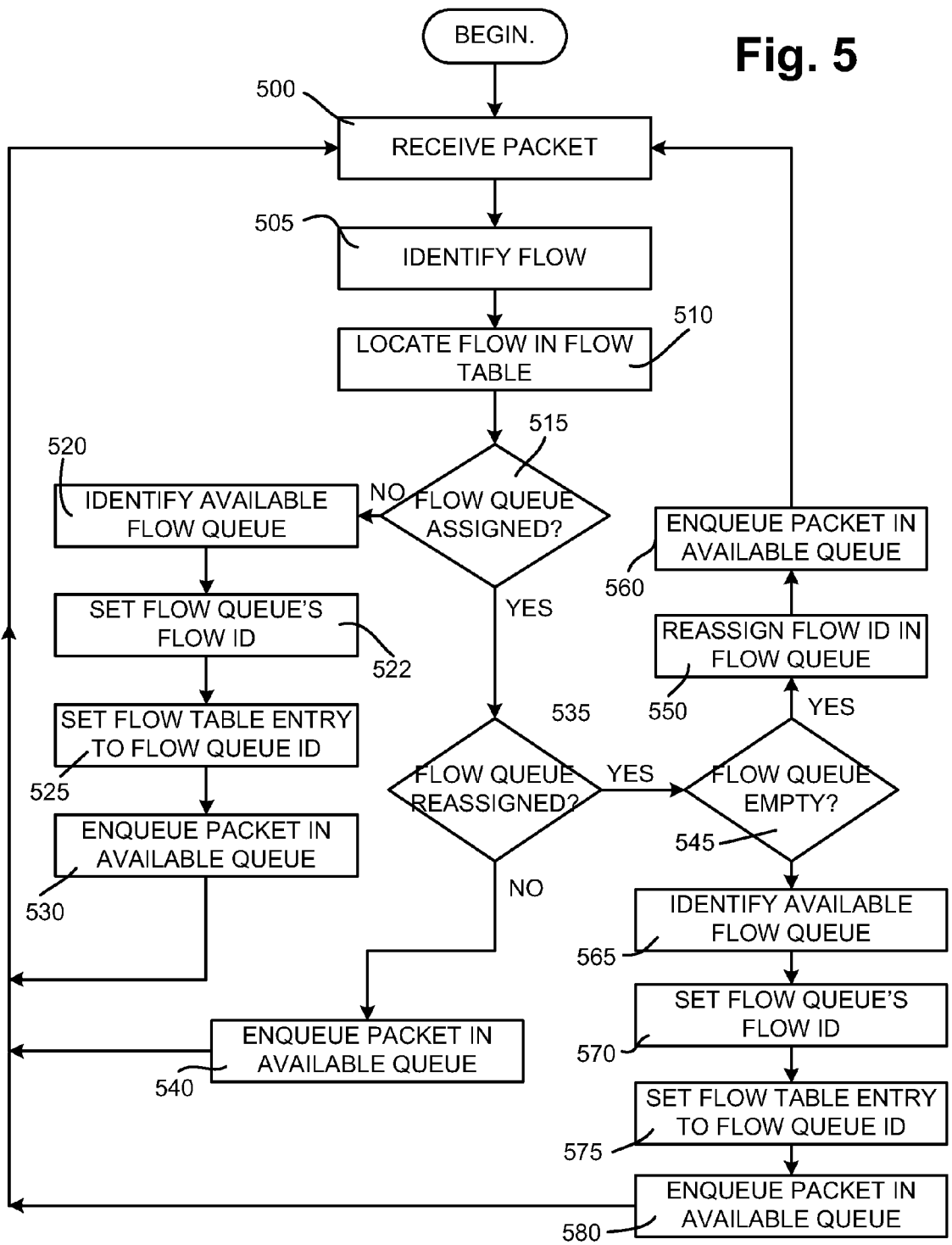

FLOW-BASED QUEUING OF NETWORK TRAFFIC

This application is a continuation of U.S. patent application Ser. No. 11/426,124, now U.S. Pat. No. 7,701,849, filed Jun. 23, 2006, the disclosure of which is incorporated herein by reference.

BACKGROUND OF THE INVENTION

A. Field of the Invention

Concepts described herein relate generally to network traffic flow, and more particularly, to per-flow queuing of network traffic to support enhanced quality of service requirements.

B. Description of Related Art

In an increasingly networked world, more and more traffic, such as data, voice, and video, is transmitted over public and proprietary networks. When routing traffic through the network, it is desirable to be able to assign different types of traffic different priorities as the traffic traverses the network. Some applications require stringent limits on end-to-end traffic delay while other applications require minimal bandwidth guarantees. For example, because streaming video and voice data, when it is delayed, can result in a noticeable degradation in quality to the end-user, it may be desirable to assign this type of traffic a higher priority than other traffic.

In Internet Protocol (IP) packet-based networks, each packet may include a header section, a portion of which may be used to indicate the traffic class or "flow" to which the packet is assigned. A router at the edge of a network may set the flow for a packet. Routers in the core of the network may identify a flow to which traffic belongs and handle the flow accordingly. More specifically, a router may allocate network resources (such as bandwidth) to certain flows within the router based on predetermined bandwidth allocation policies. Typically, within the router, packets of different flow queues that are routed to the same output port share the link resources of the output port. When the incoming traffic data rate exceeds the output port link capacity, the packets may be buffered and the bandwidth allocation policies applied.

One known set of techniques for allocating bandwidth are flow-based scheduling techniques, such as the so-called Flow-Based Fair Queuing (FBFQ) technique that ensures delay and/or bandwidth guarantees for particular flows. In these techniques, a flow associated with each received packet is used to determine how often the traffic belonging to the flow should be served based on certain pre-defined rules.

One problem with known flow-based bandwidth allocation techniques is that they are insufficiently scalable because of high memory space requirement. Conventional network devices that support flow-based quality of service (QoS) today typically set a ceiling for the number of flow queues that may be supported in the system. Once this ceiling has been reached, the system cannot handle any additional flows. A flow queue is released when the system ensures that the flow is terminated or is no longer active.

There is a need in the art to implement more flexible flow-based bandwidth allocation techniques that support an increased number of flows.

SUMMARY

In one aspect, a method for queuing packets is provided. The method may include receiving a packet; identifying a flow associated with the packet; determining whether a flow queue has been assigned to the identified flow; dynamically assigning the identified flow to an available flow queue when it is determined that a flow queue has not been assigned to the identified flow; and enqueuing the packet into the available flow queue.

In another aspect, a network device may include an input interface configured to receive a data unit; an output interface configured to forward the data unit to another network device; a plurality of flow queues associated with the output interface and configured to store the data units or pointers to the data units, each of the plurality of flow queues being dynamically assigned to flows associated with the data unit; and a scheduler component. The scheduler component may be configured to identify a flow associated with the data unit; determine whether the flow associated with the data unit has been assigned to a flow queue in the plurality of flow queues; dynamically assign the flow associated with the data unit to an available flow queue when it is determined that the flow associated with the data unit has not been assigned to a flow queue in the plurality of flow queues; and store the data unit in the available flow queue.

Another aspect is directed to a network device including logic configured to maintain a flow table including flow information for each supported flow, wherein the flow information for each flow includes a flow identifier, and a flow queue identifier; receive a packet; identify the flow identifier associated with the packet; determine whether the flow information associated with the flow identifier includes a flow queue identifier; identifying an available flow queue from a pool of flow queues when it is determined that the flow information associated with the flow identifier does not include a flow queue identifier; add the flow queue identifier associated with the available flow queue to the flow information associated with the flow identifier; assign the flow identifier to the available flow queue; and enqueue the packet in the available flow queue.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a flow chart illustrating acts that may be performed in mapping packets for respective flows to one of the physical flow queues.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a packet scheduler identifies packets from transmit queues for transmission on an output port or "wire". Although the following description refers to "packets", it should be understood that scheduling and queuing of network traffic may be performed based on any suitable data unit, such as cells, frames, non-packet data, etc. Subsequent processing following packet selection, such as encapsulation, fragmentation, etc., may result in the addition of or removal of bytes from an actually transmitted packet.

Exemplary System Overview

The following detailed description of the invention refers to the accompanying drawings. The same reference numbers in different drawings may identify the same or similar elements.

Figure 1:
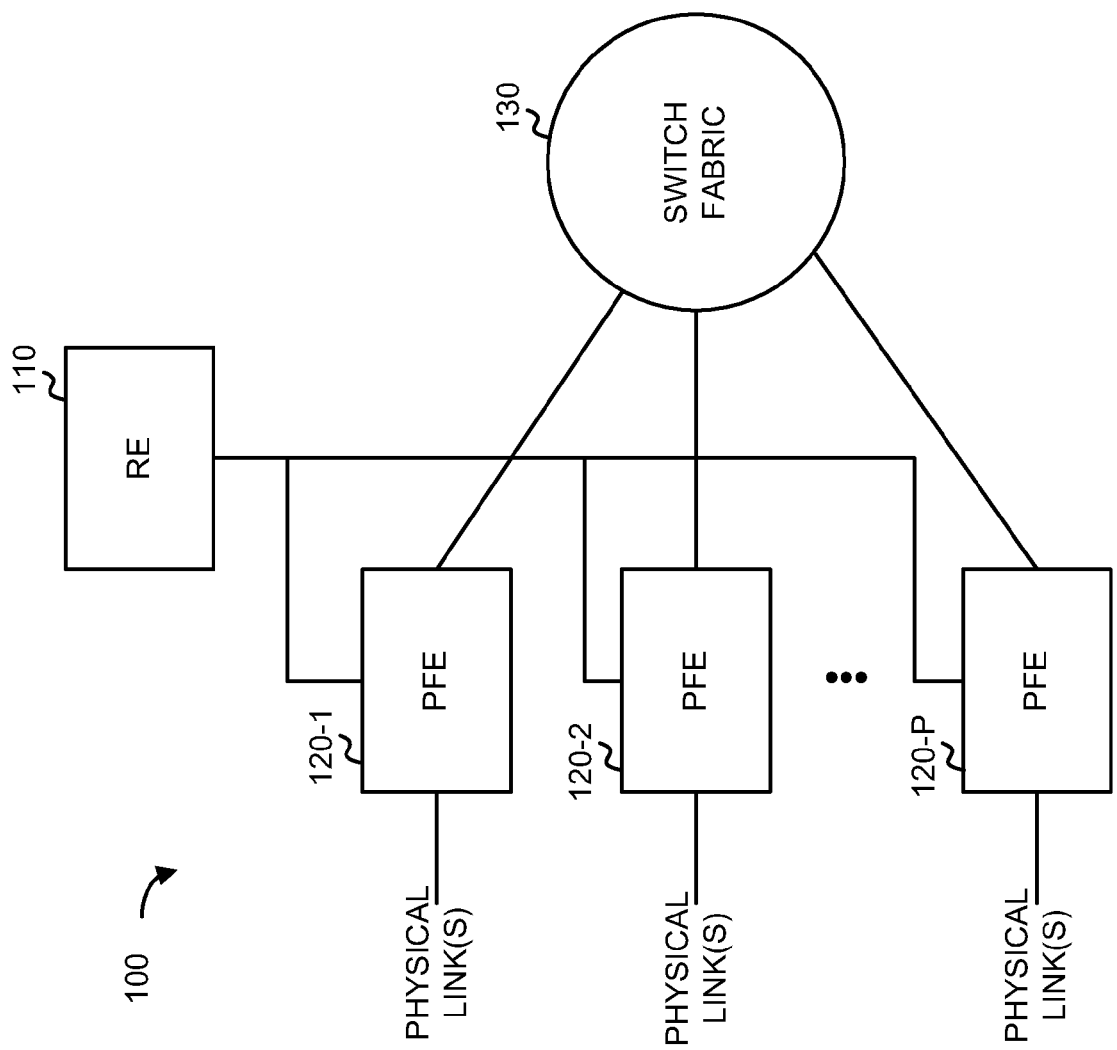
FIG. 1 is an exemplary diagram of a system in which concepts consistent with the principles of the invention may be implemented.

FIG. 1 is a block diagram illustrating an exemplary routing system 100 in which systems and methods consistent with the principles of the invention may be implemented. System 100 receives one or more packet streams from a physical link, processes the packet stream(s) to determine destination information, and transmits the packet stream(s) out on a link in accordance with the destination information. System 100 may include a routing engine (RE) 110, packet forwarding engines (PFEs) 120-1 through 120-P (collectively referred to as PFEs 120), and a switch fabric 130.

RE 110 may perform high level management functions for system 100. For example, RE 110 may communicate with other networks and systems connected to system 100 to exchange information regarding network topology. RE 110 may create routing tables based on network topology information, create forwarding tables based on the routing tables, and forward the forwarding tables to PFEs 120. PFEs 120 may use the forwarding tables to perform route lookup for incoming packets. RE 110 may also performs other general control and monitoring functions for system 100.

PFEs 120 may each connect to RE 110 and switch fabric 130. PFEs 120 receive packet data on physical links connected to a network, such as a wide area network (WAN) or a local area network (LAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet. The data may take the form of data units, where each data unit may include all or a portion of a packet.

PFEs 120 may form data structures called notifications based on the layer 2 (L2), layer 3 (L3), and control information, and perform route lookups using the notification and the routing table from RE 110 to determine destination information. PFEs 120 may also further process the notification to perform protocol-specific functions, policing, and accounting, and might even modify the notification to form a new notification.

If the destination indicates that the packet should be sent out on a physical link connected to PFE 120, then PFE 120 may prepare the packet for transmission by, for example, segmenting the packet into data units, adding any necessary headers, and transmitting the data units from the port associated with the physical link. If the destination indicates that the data should be sent to another PFE via switch fabric 130, then PFE 120 prepares the data for transmission to the other PFE, if necessary, and sends the data to the other PFE via switch fabric 130.

In summary, in one implementation, RE 110, PFEs 120, and switch fabric 130 perform routing based on packet-level processing. PFEs 120 store each packet in cells while performing a route lookup using a notification, which is based on packet header information. A packet might be received on one PFE and go back out to the network on the same PFE, or be sent through switch fabric 130 to be sent out to the network on a different PFE.

Figure 2:
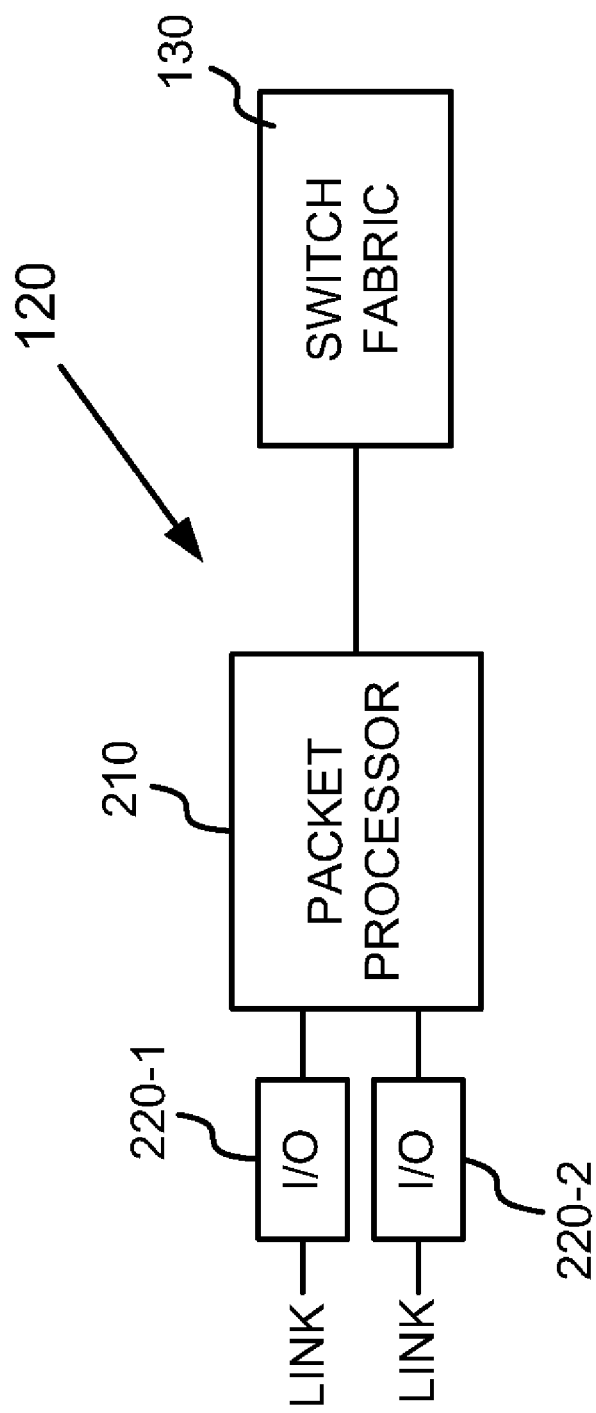
FIG. 2 is an exemplary block diagram illustrating a portion of a packet forwarding engine as shown in FIG. 1.

FIG. 2 is an exemplary block diagram illustrating a portion of PFE 120 according to an implementation consistent with the principles of the invention. PFE 120 may include a packet processor 210 and a set of input/output (I/O) units 220-1 through 220-2 (collectively referred to as I/O units 220). Although FIG. 2 shows two I/O units 220 connected to packet processor 210, in other implementations consistent with principles of the invention, there can be more or fewer I/O units 220 and/or additional packet processors 210.

Packet processor 210 may perform routing functions and handle packet transfers to and from I/O units 220 and switch fabric 130. For each packet it handles, packet processor 210 may perform the previously-discussed route lookup function and may perform other processing-related functions.

An I/O unit 220-1 may operate as an interface between its physical link and packet processor 210. In one implementation, each of I/Os 220 may be a physical interface card (PIC). Different I/O units may be designed to handle different types of physical links. For example, one of I/Os 220 may be an interface for an optical link, while another of I/Os may be an interface for an Ethernet link, implementing any of a number of well-known protocols.

Exemplary Flow Handling

Aspects of the invention provide for flexible allocation of bandwidth in a router or switch. An administrator of the router or switch, by setting a relatively few number of parameters, can exercise fine control of relative priority policies of the bandwidth allocation at routing system 100.

Figure 3:
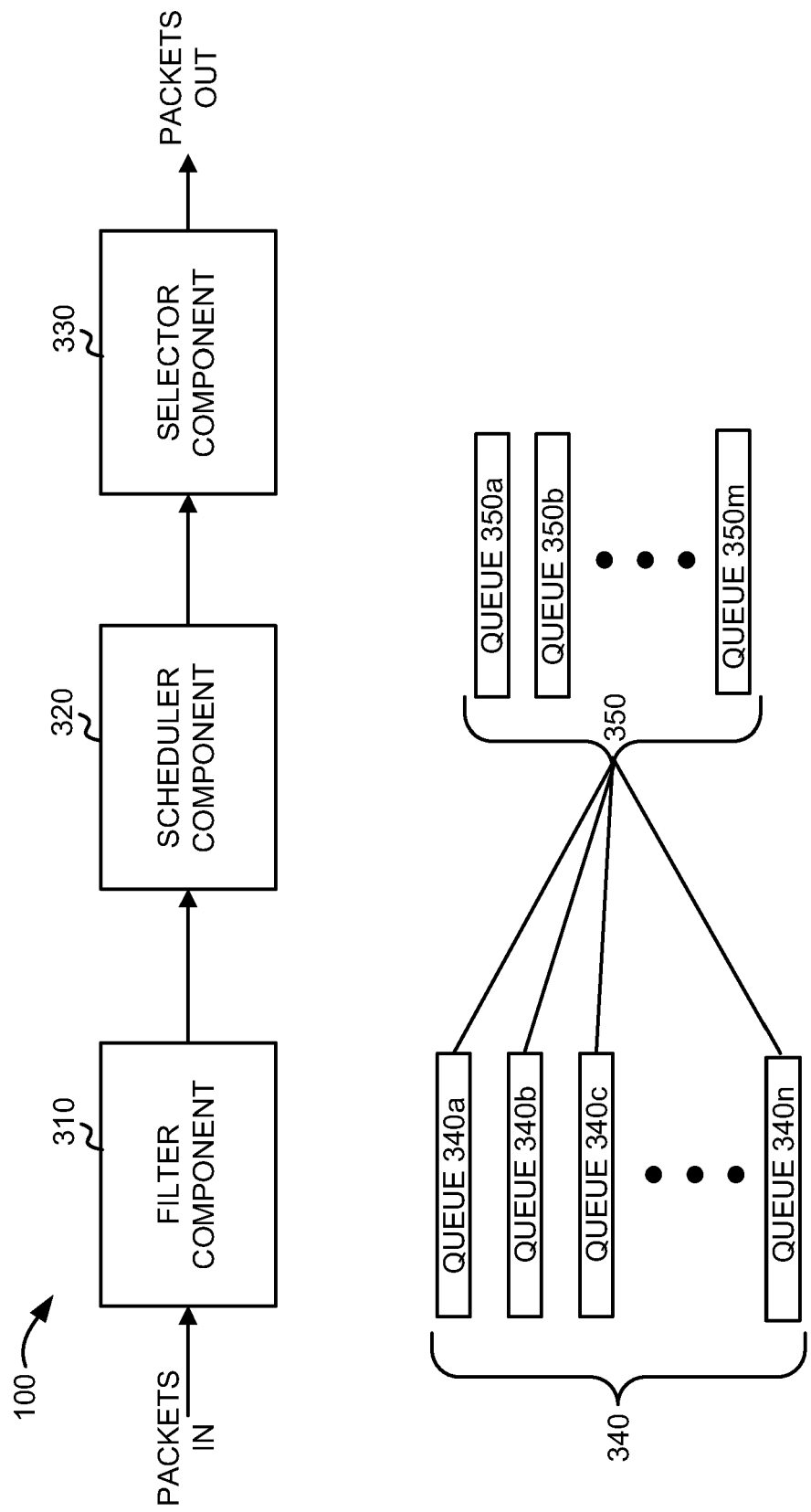
FIG. 3 is a diagram conceptually illustrating exemplary components for allocating bandwidth in a network device.

FIG. 3 is a diagram conceptually illustrating exemplary components for allocating bandwidth in a network device. In practice, the elements shown in FIG. 3 may be implemented in, for example, a router, switch or other network device, such as within a PFE 201.

As shown in FIG. 3, the router may include a filter component 310, a scheduler component 320, and a selector component 330. In general, these components may act to identify a flow associated with the incoming packets and schedule transmission of the packets based on the identified flow. Although bandwidth allocation will be described as operating on packets, more generally, the techniques described herein may be applied to frames, cells, or other data units in a network device. Additionally, instead of receiving a complete packet at filter component 310, filter component 310 may only receive a header of the packet, a portion of the header, or some other data structure relating to the header of the packet. In this situation, the remainder of the packet may be stored in a different memory and then combined with an appropriate header before being transmitted.

Filter component 310 may identify flows for incoming packets based on various types of information. In one implementation consistent with principles of the invention, such a flow identification may be based on packet information such as source and destination addresses, source and destination ports, and type of protocol. A packet's flow may then be used to define its priority or weighting.

Scheduler component 320 may assign the packets output from filter 310 to an appropriate queue. As described briefly above, conventional router scheduler components maintain a separate queue for each identified flow. Unfortunately, this methodology places limits on the number of flows supported by a network device, with packets belonging to additional flows being either dropped or subjected to additional processing.

To remedy this deficiency, a system consistent with principles of the invention provides a number of virtual queues 340a through 340n (where n is the number of supported flows in system 100) supporting an essentially limitless number of potential flows received or processed by system 100. Virtual queues 340a through 340n may be collectively referred to as "virtual queues 340". Packets (or pointers to packets) in each virtual queue 340 may be members of a same identified flow.

Depending on a number of currently active flows (that is, those flows having at least one packet in system 100), packets in each virtual queue may be mapped to an available one of physical flow queues 350a through 350m (where m is the largest number of physical flow queues available and is generally less than the number of possibly supported flows n). In an embodiment consistent with principles of the invention, the number of physical flow queues m may be the smaller of the maximum number of packets simultaneously supported in system 100 and the maximum queue entries or slots allocated to all physical queues 350a through 350m. In a manner consistent with principles of the invention, virtual queues 340 may be implemented as a flow table for facilitating flow mapping to one or physical flow queues 350a through 350m.

Each flow queue 350a through 350m may store packets (or pointers to packets) of a particular flow that is destined for a particular output port. However, the flow associated with a respective flow queue 350a though 350m is not static and may change depending on activity of respective flows in system 100. Each of queues 350 may be implemented as first-in-first-out (FIFO) queues.

Additionally, each flow queue 350 may be associated with a weight. The weights assigned to the queues may used to implement weighted bandwidth allocation. For example, each weight may represent the portion of the available bandwidth that is to be allocated to the queue.

Scheduler component 320 may assign the weights to each of the physical flow queues 350. Scheduler component 320 may periodically or intermittently update the weights for queues 350, such as whenever there is a change in the flow associated with the queues. In one implementation, the weights may be assigned based on weighting policies that are configured by an administrator. Consistent with an aspect of the invention, through the selection of a relatively few parameters, an administrator may configure system 100 to support one or more relative priority policies.

Selector component 330 may determine which physical flow queues 350 to serve (i.e., the queue from which to dequeue a packet) based on the weights assigned to each of the queues. For example, the total weight of a link may be apportioned to the queues associated with the link in proportion to their weights.

Figure 4:
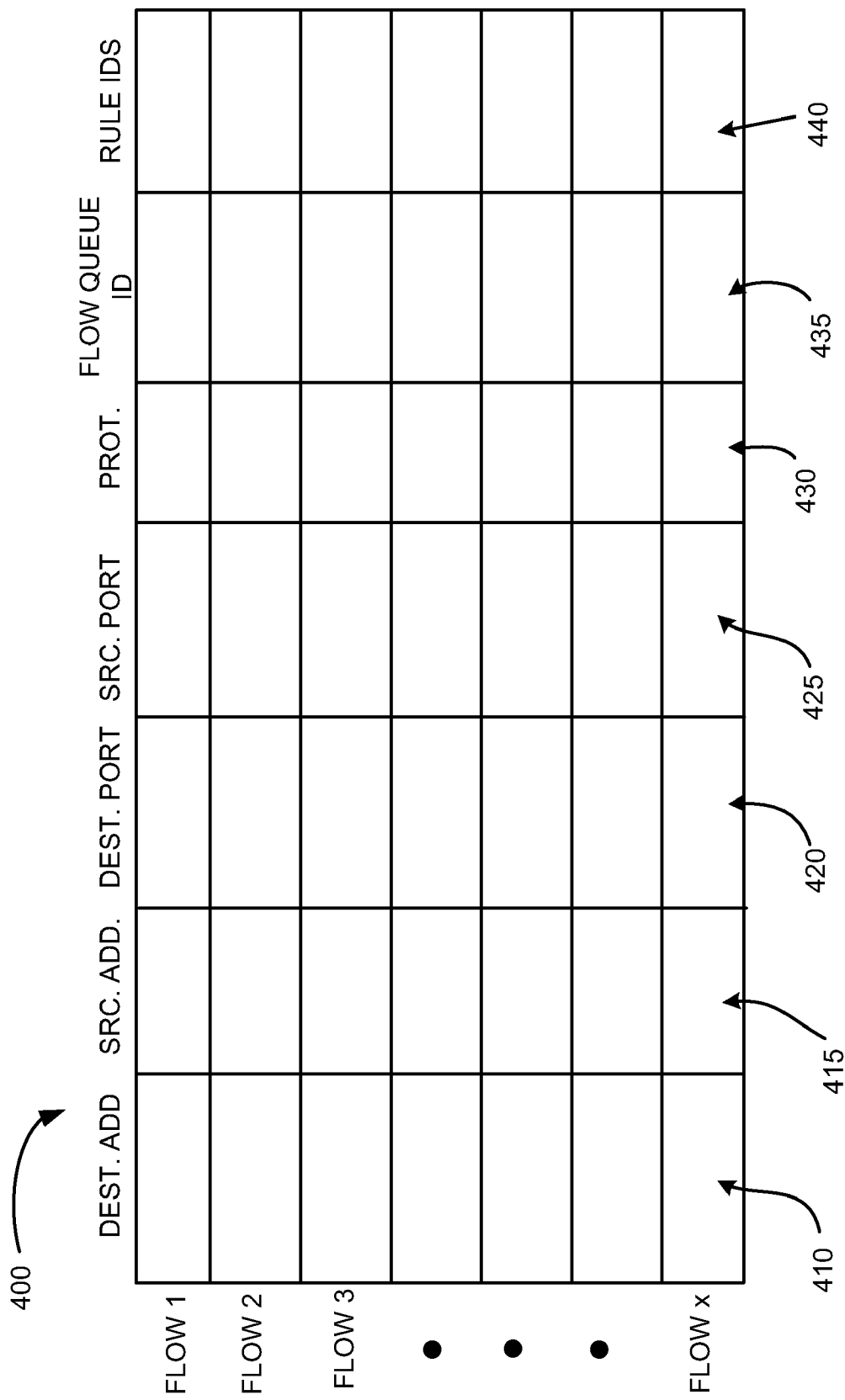
FIG. 4 is an exemplary flow table for mapping identified flows for received packets to physical flow queues.

FIG. 4 is an exemplary flow table 400 for mapping identified flows for received packets to physical flow queues 350a through 350m. Flow table 400 may include entries for each of flows 1 through x. Exemplary entries may include a destination address 410, source address 415, destination port 420, source port 425, protocol identifier 430, a flow queue identifier 435 identifying one of physical flow queues 350a through 350m, and one or more flow processing rule identifiers 440 identifying various QoS policy and processing associated with the identified flow. Flow identification entries 410, 415, 420, 425, and 430 may be referred to as a packet's "5 tuple" and may collectively be used to identifying a flow associated with a received packet.

In one embodiment, a hash value of the flow identification entries 410, 415, 420, 425, and 430 may be used as the flow identifier. Further, the size of flow table 400 may include the total number of flows that may be handled by system 100. This size may be as large as a few million, since some entries of less active flows can be stored either in flash memory or in hard disk when no active packets are present in system 100.

FIG. 5 is a flow diagram flow chart illustrating acts that may be performed in mapping packets for respective flows to one of physical flow queues 350a through 350m. Processing may begin upon receipt of a packet by scheduler component 320 of FIG. 3 (act 500). Upon receipt, the packet may be analyzed to determine the flow to which it belongs (act 505). As described above, this determination may include parsing the packet's header information and performing a hash operation on identified information included therein.

Flow table 400 may then be searched for the received packet's flow identifier (act 510). It may then be determined whether one of physical flow queues 350a through 350m has been previously assigned to the identified flow (act 515). If not, an available physical flow queue 350 is identified (act 520). It should be noted that, consistent with principles of the invention, a physical flow queue 350 will be available in system 100 since the packet is currently being processed by system 100 and sufficient flow queues 350 exist for each packet possibly processed by system 100. In one embodiment, an available physical flow queue 350 may be identified using, a single or double hashing scheme.

More specifically, the flow identifier associated with the packet may be applied to a first hashing function, thereby mapping the flow identifier to a flow queue identifier included within the potentially available flow queues. Should this flow queue be in use, a second, different hashing function may be applied to the flow identifier, resulting in another flow queue identifier. Because the number of flow queue identifiers may be significantly lower than the number of flow identifiers, collisions may be possible, and depending on system saturation, likely. By applying a second hashing function in the event of a collision, the likelihood of successive collisions is reduced.

In another implementation consistent with principles of the invention, an empty flow queue list may be maintained, for example, in a memory associated with system 100. In such an implementation, a listing of empty and available flow queues may be maintained, thereby facilitating identification of available flow queues, should one or more hashing collisions result.

Regardless of the manner of identification, once an available physical flow queue has been identified, a flow identifier associated with the selected physical flow queue 350 is set to the packet's flow identifier (act 522). Additionally, a flow queue identifier is entered in flow table 400 associated with the received packet's flow to ensure that subsequent packets belonging to this flow are placed in the same physical flow queue 350 (act 525). The received packet may then be placed into the identified physical flow queue 350 for forwarding in accordance with system's per-flow processing rules (act 530). Processing may then return to act 500 for receipt of a next packet.

If it is determined in act 515 that one of physical flow queues 350a through 350m has been previously assigned to the identified flow, it is then determined whether the identified physical flow queue has been reassigned to a different flow, perhaps caused by a period of inactivity of the packet's flow during which no packets belonging to the flow were active within system 100 (act 535). This may be done by comparing the flow identifier associated with queue 350 with the received packet's flow identifier. If the flow identifiers for the flow queue 350 and the received packet match, the packet is placed into the identified flow queue 350 (act 540) and processing may return to act 500 for receipt of a next packet.

If the flow identifiers for the flow queue 350 and the received packet do not match, it is then determined whether the previously identified flow queue 350 is empty (act 545). If it is empty, the flow identifier associated with the identified flow queue 350 may be reassigned to the flow identifier of the received packet (act 550) and the packet may be placed in the queue for forwarding (act 560).

However, if the identified flow queue is not empty, scheduler 320 must identify an available flow queue 350 to receive the packet (act 565). Once an available physical flow queue has been identified, the flow identifier associated with the selected physical flow queue 350 is set to the packet's flow identifier (act 570) and the flow queue identifier associated with queue 350 is entered in flow table 400 associated with the received packet's flow to ensure that subsequent packets belonging to this flow are placed in the same physical flow queue 350 (act 575). The received packet may then be placed into the identified physical flow queue 350 for forwarding in accordance with system's per-flow processing rules (act 580). Processing may then return to act 500 for receipt of a next packet.

By dynamically assigning physical flow queues 350 to packets in system 100, an increased number of flows may be supported over conventional flow-based queuing systems. Moreover, the above-described system is very efficient, resulting in a one-to-one correspondence between flow and flow queue for active flows in the system.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of acts have been described with regard to FIG. 5, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of network topologies, software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
  receiving, by a device, a packet;
  identifying, by the device, a particular flow, of a plurality of flows, associated with the received packet,
  where identifying the particular flow includes:
    performing a function, based on information associated with the received packet, to obtain a value, and
    identifying the particular flow based on the obtained value;
  determining, by the device, whether a flow queue, of a plurality of flow queues, has been assigned to the particular flow associated with the received packet;
  dynamically assigning, by the device, the particular flow to an available flow queue, of a plurality of available flow queues, when no flow queue has been assigned to the particular flow; and
  enqueuing, by the device, the received packet into the available flow queue after the particular flow has been dynamically assigned to the available flow queue.

2. The method of claim 1, where the information associated with the received packet includes at least one of a source address, a destination address, a source port, a destination port, or a protocol identifier, and
  where performing the function comprises:
    performing a hashing function, based on the at least one of the source address, the destination address, the source port, the destination port, or the protocol identifier, to obtain the value.

3. The method of claim 1, further comprising:
  determining that a flow queue, of the plurality of flow queues, associated with a flow queue identifier that corresponds to the obtained value, is in use;
  performing, when the flow queue is in use and based on the information, a second, different function to obtain a second value; and
  identifying the available flow queue based on the obtained second value.

4. The method of claim 1, further comprising:
  receiving another packet associated with the particular flow; and
  enqueuing the received other packet into the available flow queue.

5. The method of claim 1, where the received packet correspond to a first packet, the particular flow corresponds to a first flow, and the flow queue corresponds to a first flow queue, the method further comprising:
  identifying a second flow, of the plurality of flows, associated with a received second packet;
  determining that a second flow queue, of the plurality of flow queues, has been previously assigned to the second flow;
  determining whether the second flow queue has been reassigned to a third flow; and
  determining, when the second flow queue has been reassigned to the third flow, whether the second flow queue is empty.

6. The method of claim 5, further comprising:
  enqueuing the second packet, into the second flow queue, when the second flow queue is empty; and
  enqueuing the second packet into a third flow queue, of the plurality of flow queues, when the second flow queue is not empty.

7. A system comprising:
one or more components, implemented at least partially in hardware, to:
receive information included in a packet;
identify a flow, of a plurality of flows, associated with the packet, based on the information,
where, when identifying the flow, the one or more components are to:
perform a function, based on the information, to obtain a value, and
identify the flow based on the obtained value;
determine whether a flow queue, of a plurality of flow queues, has been assigned to the flow associated with the packet;
dynamically assign the flow, associated with the packet, to an available flow queue, of a plurality of available flow queues, when no flow queue has been assigned to the flow; and
enqueue the packet into the available flow queue when the flow has been dynamically assigned to the available flow queue.

8. The system of claim 7, where the one or more components are further to:
determine that a particular flow queue, of the plurality of flow queues, has been previously assigned to the flow associated with the packet;
determine that the particular flow queue has been reassigned to a second flow; and
determine whether the particular flow queue is empty.

9. The system of claim 8, where the one or more components are further to:
determine that the particular flow queue is not empty, and
dynamically assign the flow to the available flow queue when the particular flow queue is not empty.

10. The system of claim 7, where the information included in the packet comprises information associated a header of the packet, and
where, when performing the function, the one or more components are to:
perform a hash function using the information associated with the header of the packet, and
identify the flow based on a hash value of the performed hash function,
where the obtained value includes the hash value.

11. The system of claim 10, where, when dynamically assigning the flow to the available flow queue, the one or more components are to:
set flow identification information, associated with the available flow queue, to the hash value.

12. The system of claim 7, where the one or more components are further to:
assign a weight to the available flow queue, the weight corresponding to a bandwidth allocated to the available flow queue, and
dequeue one or more packets from the available flow queue based on the weight.

13. The system of claim 7, where, when determining whether a flow queue has been assigned to the flow, the one or more components are to:
search a table for identification information of the flow,
where the table stores identification information, associated with flow queues, that correspond to identification information of flows that are associated with the flow queues.

14. A device comprising:
logic, implemented at least partially in hardware, to:
receive information associated with a header of a packet;
identify a flow, of a plurality of flows, associated with the packet, based on the information associated with the header of the packet,
where, when identifying the flow, the logic is to:
perform a function, based on the information associated with the header of the packet, to obtain a value, and
identifying the flow based on the obtained value;
determine whether a flow queue, of a plurality of flow queues, has been assigned to the flow associated with the packet;
assign the flow, associated with the packet, to an available flow queue, of a plurality of available flow queues, when no flow queue has been assigned to the flow; and
enqueue the packet into the available flow queue after the flow has been assigned to the available flow queue.

15. The device of claim 14, where, when performing the function, the logic is to:
perform a hash function using the information associated with the header of the packet, and
identify the flow based on a hash value of the performed hash function,
where the obtained value includes the hash value.

16. The device of claim 15, where, when determining whether a flow queue has been assigned to the flow, the logic is to:
search a table, that stores identification information of the plurality of flow queues, based on the hash value,
where the identification information, of one or more of the plurality of flow queues, corresponds to identification information of one or more respective flows, of the plurality of flows.

17. The device of claim 15, where, when dynamically assigning the flow to the available flow queue, the logic is to:
set flow identification information of the available flow queue to the hash value.

18. The device of claim 14, where the logic is further to:
receive at least one other packet associated with the flow; and
enqueue the at least one other packet into the available flow queue.

19. The device of claim 14, where the packet corresponds to a first packet, the flow corresponds to a first flow, and the flow queue corresponds to a first flow queue,
where the logic is further to:
identify a second flow, of the plurality of flows, associated with a received second packet,
determine that a second flow queue, of the plurality of flow queues, has been previously assigned to the second flow,
determine whether the second flow queue has been reassigned to a third flow,
determine whether the second flow queue is empty, when the flow queue is reassigned to the third flow, and
enqueue the second packet into a third flow queue, of the plurality of flow queues, when the second flow queue is not empty.

* * * * *

UNITED STATES PATENT AND TRADEMARK OFFICE
CERTIFICATE OF CORRECTION

| | |
|---|---|
| PATENT NO. | : 8,064,344 B2 |
| APPLICATION NO. | : 12/706478 |
| DATED | : November 22, 2011 |
| INVENTOR(S) | : Ma |

Page 1 of 1

It is certified that error appears in the above-identified patent and that said Letters Patent is hereby corrected as shown below:

Claim 5, Column 8, Lines 52-53 reads "identifying a second flow, of the plurality of flows, associated with a received second packet", but should read --identifying a second flow, of the plurality of flows, associated with a [[received]] second packet--.

Signed and Sealed this
Thirty-first Day of January, 2012

David J. Kappos
*Director of the United States Patent and Trademark Office*